US012802192B2

(12) United States Patent
Sotgiu et al.

(10) Patent No.: US 12,802,192 B2
(45) Date of Patent: Nov. 17, 2026

(54) APPLICATION OF AI-BASED IMAGE PROCESSING IN VEHICLE WHEEL SERVICING

(71) Applicant: Snap-on Equipment Srl a unico socio, Correggio (IT)

(72) Inventors: Paolo Sotgiu, Modena (IT); Robert J. D'Agostino, Conway, AR (US)

(73) Assignee: Snap-on Equipment Srl a unico socio, Correggio (IT)

( * ) Notice: Subject to any disclaimer, the term of this patent is extended or adjusted under 35 U.S.C. 154(b) by 277 days.

(21) Appl. No.: 18/629,128

(22) Filed: Apr. 8, 2024

(65) Prior Publication Data

US 2024/0257328 A1 Aug. 1, 2024

(51) Int. Cl.

| | |
|---|---|
| ***G06K 9/00*** | (2022.01) |
| ***B60C 25/05*** | (2006.01) |
| ***B60S 5/00*** | (2006.01) |
| ***G06T 7/00*** | (2017.01) |
| ***G06V 10/82*** | (2022.01) |
| ***G06V 20/60*** | (2022.01) |

(52) U.S. Cl.

CPC ........ *G06T 7/0002* (2013.01); *B60C 25/0515* (2013.01); *B60S 5/00* (2013.01); *G06V 10/82* (2022.01); *G06V 20/60* (2022.01); *G06T 2207/20084* (2013.01); *G06V 2201/08* (2022.01)

(58) Field of Classification Search

CPC ......... G06T 7/0002; G06T 2207/20084; B60C 25/0515; B60C 25/138; B60S 5/00; G06V 10/82; G06V 20/60; G06V 2201/08

See application file for complete search history.

(56) References Cited

U.S. PATENT DOCUMENTS

| | | | | |
|---|---|---|---|---|
| 8,019,501 | B2 * | 9/2011 | Breed | H01H 35/146 701/31.9 |
| 2011/0174446 | A1 | 7/2011 | Braghiroli et al. | |
| 2023/0052365 | A1 | 2/2023 | Vargo et al. | |

FOREIGN PATENT DOCUMENTS

| | | | |
|---|---|---|---|
| CN | 101629815 | B | 4/2011 |
| CN | 115546463 | A | 12/2022 |

(Continued)

OTHER PUBLICATIONS

Partial European Search Report issued in EP 25 16 8896.6-1001 by the European Patent Office on Sep. 9, 2025, which is related to U.S. Appl. No. 18/629,128.

*Primary Examiner* — Duy M Dang

(74) *Attorney, Agent, or Firm* — Studebaker Brackett PLLC

(57) ABSTRACT

The present disclosure pertains to apparatuses and methods for servicing a motor vehicle wheel or rim, which employ AI-based image processing. Employing AI-based image processing may help to enhance the speed, quality and safety of a tire servicing procedure. A method is provided which comprises the step of creating one or more images covering at least a portion of an apparatus for servicing the motor vehicle wheel or rim; and the step of applying an AI-based model to the one or more images. In some implementations, the step of applying an AI-based model comprises the sub-step of determining a current configuration of the apparatus and/or the vehicle rim. Moreover, an apparatus for servicing a motor vehicle wheel or rim is provided, which is specifically adapted for performing such methods.

14 Claims, 5 Drawing Sheets

(56) References Cited

FOREIGN PATENT DOCUMENTS

| | | | |
|---|---|---|---|
| EP | 2949486 | A1 | 12/2015 |
| EP | 2949488 | A1 | 12/2015 |
| EP | 4032729 | A1 | 7/2022 |
| EP | 4279298 | A1 | 11/2023 |
| IT | 202100015164 | A1 | 12/2022 |
| WO | 2024/205772 | A1 | 10/2024 |

* cited by examiner

APPLICATION OF AI-BASED IMAGE PROCESSING IN VEHICLE WHEEL SERVICING

FIELD

The present disclosure generally relates to methods and apparatuses for servicing a motor vehicle or motor vehicle wheel or motor vehicle rim, which apply AI-based image processing to determine a current configuration of the apparatus and/or vehicle rim and/or vehicle wheel.

PRIOR ART

US 2011/0174446 A1 of the present applicant discloses a method for mounting a tire on a rim to form a motor vehicle wheel and for demounting a tire from a rim with at least one fitting or removal tool, wherein images of the wheel or the rim are created by a vision system and corresponding signals are sent to a computer, wherein commands to move the at least one fitting or removal tool are sent to the at least one fitting or removal tool by the computer, wherein the signals of the vision system and the at least one command sent to the at least one fitting or removal tool are correlated to define the position of the at least one fitting or removal tool relative to the rim contour and wherein the movement of the at least one fitting or removal tool is guided in dependence on the performed correlation without contacting the rim surface.

Italian patent application Ser. No. 10/202,1000015164 of the present applicant proposes a method for verifying that, throughout the wheel handling operations, particularly the operations of mounting the tire on the respective rim or demounting the tire from the respective rim, the TPMS sensor is always located at a safe distance from the mounting/demounting tools and/or from the tire bead. Specifically, the method illustrated in Italian patent application Ser. No. 10/202,1000015164 has the aim of ascertaining and appropriately documenting the fact that, throughout the execution of the wheel handling operations, the relative distance between the TPMS sensor and the mounting/demounting tools and/or the portions of the rim subject to most stress from any contact with the bead of the tire always remains substantially such as to ensure the correct execution of the procedure and thus avoid possible damage.

EP 4279298 A1 of the present applicant discloses a simple and reliable method for verifying the execution of a procedure of mounting/demounting tires on/from respective rims of vehicle wheels using an apparatus for handling vehicle wheels. The method shown by EP 4279298 A1 is designed to verify that, throughout the performance of the wheel handling operations, particularly the operations of mounting the tire on the respective rim or demounting the tire from the respective rim, the TPMS sensor is always located at a safe distance from the mounting/demounting tools. The method proposed by EP 4279298 A1 is also designed to verify that, throughout the performance of the wheel handling operation, the risk that the tire bead will come into contact with the TPMS sensor, where present, is minimized.

While the known prior art solutions enable adequate tire servicing, there is still room for improvement in connection with enhancing the speed, quality and safety of a tire servicing procedure, for instance a tire fitting or removal operation or else a wheel or rim balancing operation.

SUMMARY

The present disclosure pertains to apparatuses and methods for servicing a motor vehicle or motor vehicle wheel or rim, which employ AI-based image processing. Employing AI-based image processing may help to enhance the speed, quality and safety of a vehicle or tire servicing procedure.

Aspects of the Disclosed Technology

In a first aspect, a method for servicing a motor vehicle wheel or a motor vehicle rim is provided.

The method of the first aspect comprises the step of creating one or more images covering at least a portion of an apparatus for servicing the motor vehicle wheel or rim; and the step of applying an AI-based model to the one or more images. In some implementations, the step of applying an AI-based model comprises the sub-step of determining a current configuration of the apparatus and/or the vehicle rim. For example, the AI-based model may comprise any one or more of the AI-based models described elsewhere herein. In some implementations, the method is computer-implemented.

In a second aspect, an apparatus for servicing a motor vehicle or motor vehicle wheel or rim is provided, which is specifically adapted for performing the method of the first aspect, or any of its particular implementations. As such, any disclosure of methods of the first aspect herein is thus referenced for the purposes of the disclosure of the apparatus of the first aspect. In some implementations of the second aspect, the apparatus comprises a vision system configured to perform the step of creating one or more images of the apparatus, and a control unit configured to perform the step of applying an AI-based model to the one or more images of the apparatus to determine a current configuration of the apparatus and/or vehicle rim. In some embodiments, the control unit comprises data processing means for carrying out the method of the first aspect.

In a third aspect, a computer program product is provided, comprising instructions which, when executed by a computer, cause the computer to carry out the method of the first or fifth aspect.

In a fourth aspect, a computer-readable storage medium is provided, comprising instructions which, when executed by a computer, cause the computer to carry out the method of the first or fifth aspect.

In a fifth aspect, as a variation of the first aspect, a method for servicing a motor vehicle is provided. The method of the fifth aspect comprises the step of creating one or more images covering at least a portion of the motor vehicle; and the step of applying an AI-based model to the one or more images. As such, any disclosure of methods of the first aspect herein is thus referenced for the purposes of the disclosure of the methods of the fifth aspect.

In a sixth aspect, as a variation of the second aspect, an apparatus for servicing a motor vehicle is provided, which is specifically adapted for performing the method of the second aspect, or any of its particular implementations. As such, any disclosure of methods of the first and fifth aspect herein is thus referenced for the purposes of the disclosure of the apparatuses of the sixth aspect.

Employing AI-based image processing as in the first, second, third or fourth aspect may have further advantages. For example, AI-based image processing may allow to use a given hardware setup (e.g. a camera and connected computing hardware) for a wide variety of specific applications, by training the AI-based model accordingly. In some advantageous implementations, this may enable to provide existing apparatuses for servicing a motor vehicle wheel or rim with new functionalities, by updating the AI-based model's training parameters.

"Artificial intelligence" (AI) is the general category of techniques and methods for providing intelligence in machines or software or other artificial programs. AI can exist in a variety of implementations, including but not limited to the techniques described herein. Most commonly, AI is implemented through "machine learning" (ML), which entails statistical learning from data without explicit instructions from humans. In other words, machine learning involves an artificial learning process by means of which the performance on one or more given tasks is improved automatically, i.e. without human intervention during the learning process. In particular implementations, an AI-based model is a model, including but not limited to a software-implemented model, which employs any one or more of the machine learning methods or techniques described herein. It must be noted that the terms "artificial intelligence" and "machine learning" are related but not interchangeable. Machine learning is a subfield of AI that studies the ability to improve performance based on experience. Some AI-based models use machine learning to achieve competence, but others do not.

In some implementations of the disclosed technology, the learning process of machine learning can involve different techniques and methods, including but not limited to any one or more of those described in the following. "Unsupervised learning" analyzes a stream of data and finds patterns and makes predictions without any other guidance. "Supervised learning" requires a human to label the input data first, and comes in two main varieties: classification (where the program must learn to predict what category the input belongs in) and regression (where the program must deduce a numeric function based on numeric input). In "reinforcement learning" the program is rewarded for "good" responses and punished for "bad" ones. The program learns to choose responses that are classified as "good". "Transfer learning" is when the knowledge gained from one problem is applied to a new problem.

"Deep learning" is a type of machine learning that runs inputs through biologically inspired artificial neural networks for any of these types of learning. In particular, deep learning is a form of machine learning which employs the use of so-called "deep" neural networks, which consist of a series of sequential nonlinear transformations of inputs through a network of so-called neurons.

"Pattern recognition" is a commonly used alternative name for machine learning. In some implementations of the disclosed technology, pattern recognition describes the task of assigning a class to an observation based on patterns extracted from data. In some implementations, the patterns are extracted using any one or more of the learning techniques described herein.

Another common branch of AI is known as "expert systems", which are algorithms designed to solve complex problems by encoding logic and reasoning through the applications of large numbers of conditional logical statements on knowledge databases and sensor measurements.

By referring to AI-based models, we refer to all of the above (and more) general categories of methods and systems for providing intelligence in machines or software.

Further Implementations of the Disclosed Technology

In some implementations of either aspect, the method further comprises the step of identifying an intended servicing operation a user intends to perform on the vehicle wheel or rim based on the current configuration of the apparatus and/or vehicle rim. In some implementations of either aspect, the intended servicing operation is identified from a plurality of predefined servicing operations. In some implementations, the step of identifying an intended servicing operation comprises the step of applying an AI-based model, wherein the current configuration of the apparatus and/or vehicle rim serves as input to the AI-based model. In alternative embodiments, the step of identifying an intended servicing operation comprises accessing a predefined association between one or more possible current configurations with respective intended service operations, for example in the form of a look-up table.

In some implementations of either aspect, the step of applying an AI-based model comprises the sub-step of determining a current configuration of the apparatus. Alternatively or additionally, the step of applying an AI-based model comprises the sub-step of determining a current configuration of the vehicle rim. In some implementations, the (sub-)step of determining a current configuration of the apparatus is independent of the (sub-)step of determining a current configuration of the vehicle rim, or vice versa.

In some implementations of either aspect, determining the current configuration of the vehicle rim comprises the sub-step of determining the presence of a wheel or rim mounted to wheel or rim receiving means of the apparatus. In some implementations of either aspect, determining the presence of a wheel or rim mounted to wheel or rim receiving means of the apparatus is performed as a sub-step of determining the current configuration of the apparatus. In other words, in such implementations, determining the presence of a wheel or rim mounted to wheel or rim receiving means of the apparatus is performed using the AI-based model.

In alternative implementations of either aspect, determining the presence of a wheel or rim mounted to wheel or rim receiving means of the apparatus is performed as a separate step prior to the step of applying the AI-based model to determining a current configuration of the apparatus. For example, in such implementations, the presence of a wheel or rim mounted to wheel or rim receiving means of the apparatus is determined based on a sensor signal using conventional signal processing. In this context, the term conventional signal processing describes the use of a mathematical model that is not AI-based.

Alternatively or additionally, independent of whether the presence of a wheel or rim mounted to wheel or rim receiving means of the apparatus is determined using conventional signal processing or an AI-model, the step of determining the current configuration of the apparatus is only performed once the presence of a wheel or rim mounted to wheel or rim receiving means of the apparatus has been confirmed. In other words, in such implementations, detecting the presence of a wheel or rim mounted to wheel or rim receiving means of the apparatus triggers the subsequent step of determining the current configuration of the apparatus. In some implementations, as long as the presence wheel or rim mounted to wheel or rim receiving means of the apparatus has not been determined, the control unit is in a stand-by mode in which it continuously monitors for the presence of the wheel or rim mounted to wheel or rim receiving means of the apparatus. Determining the presence of a wheel or rim mounted to wheel or rim receiving means of the apparatus then serves as a wake-up signal, prompting at least the step of determining the current configuration of the apparatus. In some implementations of either aspect, determining the presence of a wheel or rim mounted to wheel or rim receiving means of the apparatus also prompts the step of creating one or more images covering at least a portion of the apparatus for servicing the motor vehicle wheel or rim.

In some implementations, the current configuration of the vehicle rim comprises the presence and/or absence of a tire mounted on the rim. In other words, the step of determining a current configuration of the vehicle rim comprises the sub-step of determining the presence and/or absence of a tire mounted on the rim. Put differently, in such implementations, the AI-based model is applied to the one or more images to determine the presence and/or absence of a tire mounted on the rim. As used herein, the term wheel describes an assembly of a tire mounted on a rim. For example, in some implementations of either aspect, the apparatus is a tire changer and the plurality of predefined servicing operations comprise tire removal and/or tire mounting (also referred to as tire fitting herein). In some implementations, the intended servicing operation is identified depending on the presence and/or absence of a tire mounted on the rim. In some implementations, if the presence of a tire mounted on the rim is detected, the intended servicing operation is identified as tire removal. Alternatively or additionally, if the absence of a tire mounted on the rim is detected, the intended servicing operation is identified as tire mounting.

Alternatively or additionally, the current configuration of the apparatus is defined by a current position and/or current orientation of at least one servicing tool of the apparatus. Put differently, in such implementations, the AI-based model is applied to the one or more images to determine a current position and/or current orientation of at least one servicing tool of the apparatus. In some implementations, the at least one servicing tool of the apparatus includes at least one mounting and/or demounting tool configured to mount and/or demount a tire to and/or from a rim. Alternatively or additionally, the at least one servicing tool includes at least one, in some implementations two, bead breaker tools, such as any type of bead breaker tool described elsewhere herein. The current configuration of the apparatus may alternatively or additionally also be defined by a current position and/or orientation of a wheel or rim receiving means of the apparatus.

Alternatively or additionally, the step of applying the AI-based model also comprises the sub-step of determining the presence of wheel and/or rim and/or tire features. Such AI-based detection of wheel and/or rim and/or tire features may beneficially reduce the chance of errors as compared to manual input of corresponding information, and/or simplify the user experience. In some implementations, the step of applying the AI-based model also comprises the sub-step of determining the position of wheel and/or rim features. Such wheel and/or rim and/or tire features include, for example, an inflation valve and/or a TPMS (Tire Pressure Monitoring System) sensor.

Alternatively or additionally, wheel and/or rim features include a number of spokes. In other words, in some implementations of either aspect, the AI-based model is configured to count the number of spokes of the wheel.

Alternatively or additionally, the step of applying the AI-based model also comprises the sub-step of determining wheel and/or rim and/or tire dimensions, including a tire code.

Alternatively or additionally, the step of applying the AI-based model also comprises the sub-step of detecting wheel and/or rim and/or tire damage.

In some implementations of either aspect, the method further comprises the step of setting up the apparatus for the intended servicing operation, in some implementations based on the current configuration of the apparatus and/or vehicle wheel. In some implementations, setting up the apparatus for the intended servicing operation comprises moving at least one servicing tool of the apparatus and/or the wheel or rim. In some implementations, setting up the apparatus for the intended servicing operation comprises moving the at least one servicing tool and/or wheel or rim to a predefined position and/or orientation associated with the intended servicing operation, such as described elsewhere herein. In some implementations, the step of setting up the apparatus for servicing the motor vehicle wheel comprises the step of bringing the apparatus into a desired configuration suitable for performing the intended servicing operation. In some implementations, the step of setting up the apparatus for servicing the motor vehicle wheel comprises the sub-steps of comparing the current configuration with a desired configuration of the apparatus, and—if the current configuration is different from the desired configuration—bringing the apparatus into the desired configuration. In some implementations, bringing the apparatus into the desired configuration comprises moving at least one servicing tool of the apparatus and/or wheel or rim. In some implementations, bringing the apparatus into the desired configuration comprises moving the at least one servicing tool and/or wheel or rim to a predefined position and/or orientation associated with the desired configuration and/or intended servicing operation, such as described elsewhere herein.

In some implementations, the desired configuration of the apparatus is identified based on the intended servicing operation that has previously been determined. In some implementations, each intended servicing operation is associated with a corresponding desired configuration of the apparatus. In some implementations, each servicing operation is associated with a unique desired configuration of the apparatus. In this context, a unique desired configuration of the apparatus associated with a respective servicing operation describes a desired configuration that is different from any other desired configuration associated with any other servicing operation from the plurality of predefined intended servicing operations. For example, in implementations in which the apparatus is a tire changer as discussed above, the intended servicing operation can be identified as tire mounting or tire removal. In some implementations, the intended servicing operation of tire mounting is associated with a corresponding desired configuration of the apparatus, which is different from a desired configuration of the apparatus associated with the intended servicing operation of tire removal. In particular, as described above with respect to the current configuration of the apparatus, each desired configuration of the apparatus is in some implementations defined by a predefined associated position and/or predefined associated orientation of at least one servicing tool of the apparatus. In some implementations, the at least one servicing tool of the apparatus includes at least one mounting and/or demounting tool configured to mount and/or demount a tire to and/or from a rim. Alternatively or additionally, the at least one servicing tool includes at least one, in some implementations two, bead breaker tools. Each desired configuration of the apparatus may alternatively or additionally also be defined by a predefined associated position and/or predefined associated orientation of a wheel or rim receiving means of the apparatus. For details on positions and orientations, it is referred to EP2949486A1, EP2949488A1 and EP4032729A1, the disclosures of which are incorporated herein by reference in their entireties.

In alternative implementations, the method further comprises the step of providing visual and/or auditory outputs guiding a human user (also referred to as operator) of the apparatus through a process of manually setting up the apparatus for the intended servicing operation based on the current configuration of the apparatus and/or vehicle wheel. In other words, in such implementations, the process of setting up the apparatus for the intended servicing operation is not performed automatically by the control unit of the apparatus as described above, but manually by the operator with guidance from the control unit. In some implementations, such visual and/or auditory outputs are provided in the form of step-by-step instructions for setting up the machine in the intended configuration, such as for tire mounting or tire demounting. In some implementations, the step-by-step instructions are provided in the form of images or videos on a screen. In some implementations, the screen can be part of the apparatus, and specifically the control unit. In other implementations, the control unit comprises an interface, such as Bluetooth and/or WiFi, for connecting to an external device capable of providing such visual and/or auditory outputs. In some implementations, such an external device comprises a smartphone.

Alternatively or additionally, the desired configuration is determined also based on the presence of wheel and/or rim and/or tire features, as determined during the step of applying the AI-based model. For example, the desired configuration can comprise an orientation of the rim such that a TPMS sensor is clear of any servicing tools of the apparatus. Alternatively or additionally, the desired configuration is determined also based on the wheel and/or rim and/or tire dimensions, as determined during the step of applying the AI-based model. For example, the desired configuration can comprise positions of one or more of the servicing tools of the apparatus which are dependent on the wheel and/or rim and/or tire dimensions.

Alternatively or additionally, the step of determining the desired configuration comprises the step of applying an AI-based model, wherein the current configuration of the apparatus and/or vehicle rim, and/or the identified intended service operation, and/or the presence of wheel and/or rim and/or tire features serves, and or the wheel and/or rim and/or tire dimensions serve as input to the AI-based model. In alternative implementations, the step of determining the desired configuration comprises accessing a non-AI-model which associates any one or more of the aforementioned inputs with a respective desired configuration.

Alternatively or additionally, the AI-based model is a Deep Neural Networks model, an SVM model, a Naïve Bayesan model, a Decision Tree model, or any combination thereof. Alternatively or additionally, the AI-based model comprises an object classifier and/or an object locating and/or an object recognition and/or an object detector and/or an instance segmentation model and/or a keypoint detector and matcher and/or an activity recognition model, or any combination thereof.

Alternatively or additionally, the vision system comprises at least one camera for creating images. Alternatively or additionally, the vision system comprises at least one camera and the AI-based model comprises a monocular 3D measurement model. Alternatively or additionally, the vision system comprises more than one camera. Alternatively or additionally, the vision system is a stereo vision system comprising at least two cameras. In some implementations, the vision system comprises a first camera positioned to provide a view of a first side (e.g. a lower side) of the wheel or rim, and a second camera positioned to provide a view of a second side (e.g. an upper side) of the wheel or rim. In some implementations, the AI-based model comprises a stereo matching model. Alternatively or additionally, at least three cameras are provided. In some implementations, the cameras are directed to the area in which the wheel or rim is positioned and create digital images of the wheel, tire or rim surface and, where present, of the at least one servicing tool.

Alternatively or additionally, the cameras may be directed to an area in which an operator or user acts. Thus, a situation can be detected in which the operator or user is in danger. Furthermore, collisions between the servicing tools and the wheel, rim and/or tire or between various tools (i.e. fitting or removal tools, hold-down devices, rotating shafts, etc.) can be avoided. In some implementations, the step of applying the AI-based model comprises the sub-step of determining the presence and/or absence of a user in the one or more images covering at least the portion of the apparatus for servicing the motor vehicle wheel or rim. In some implementations, the step of applying the AI-based model comprises the sub-step of determining a danger parameter indicative of danger for the operator or user. In some implementations, the danger parameter is Boolean, i.e. the determined danger parameter either indicates that a danger for the operator or user is detected, or that no danger is detected. In other implementations, the danger parameter is a numerical value, wherein danger is detected when the numerical value exceeds a threshold. The threshold can be predetermined or determined as part of the learning process of the AI-based model. In some implementations, the method further comprises the step of halting operation of the wheel servicing apparatus in case a danger for the operator is detected. In some implementations, the danger parameter is determined based on the operator's or user's distance to moving parts of the apparatus, and/or based on a vector of motion of the operator and/or of moving parts of the apparatus. In some implementations, the step of applying the AI-based model comprises the sub-step of calculating one or more possible future trajectories of the operator or user. In some implementations, the sub-step of calculating one or more possible future trajectories of the operator or user further comprises the sub-step of associating possibility values with each of the one or more possible future trajectories. In some implementations, the step of determining the danger parameter further comprises determining a possibility space for future locations of the operator or user. In some implementations, the step of determining the danger parameter comprises the sub-step of determining a probability of collision between the operator or user and one or more moving parts of the apparatus.

Alternatively or additionally, the vision system is calibrated. In some implementations, a "calibrated" vision system is one in which the positions of the cameras of the vision system to each other are known and determined. In some implementations, the control unit comprises data corresponding to the positions of the cameras of the vision system to each other. Alternatively or additionally, the distance of the photographed elements to the vision system or to a reference point are detected. That means that the control unit detects the coordinates of the photographed elements. According to an alternative implementation, the vision system is uncalibrated. In some implementations, an "uncalibrated" vision system is one in which the positions of the cameras of the vision system to each other are not known and will not be determined. Furthermore, the distance of the photographed elements to the vision system or to a reference point will not be detected. That means that the control unit does not detect the coordinates of the photographed elements, but the control unit detects the relative position of the elements to each other.

In an implementation of the second aspect, the apparatus comprises at least one servicing tool for servicing the wheel or rim and a control unit configured to send commands to move the at least one servicing tool (such as, any one or more of the servicing tools described elsewhere herein, for example, a tire fitting and/or removal tool, and/or a shaft for supporting and rotating the wheel and/or the rim) and/or the wheel or rim, the control unit configured to perform the method of the first aspect. In some implementations, the control unit is configured to apply an AI-based model, such as those described elsewhere herein, to detect a presence and/or absence of a tire mounted on the rim and/or a presence and position of wheel or rim features (such as, for example, an inflation valve and/or a TPMS sensor). Alternatively or additionally, the apparatus for servicing a motor vehicle wheel also comprises a vision system for creating images of the wheel or rim, wherein the vision system is operatively connected to the control unit and signals corresponding to the created images are sent to the control unit. In some implementations, the control unit, based on the signals corresponding to the created images, is configured to use the AI-based model and, based on the presence and/or absence of the tire mounted on the rim and/or the presence and position of wheel or rim features, is also configured to correspondingly and automatically set the apparatus for servicing the motor vehicle wheel, such as described elsewhere herein, in particular in conjunction with the method of the first aspect.

According to some implementations, the vision system is configured to create temporal streams of images of the wheel or rim. In other words, the vision system is configured to create films of the wheel or rim, wherein each photogram of the film is temporally identified.

Alternatively or additionally, the AI-based model is configured to detect the presence and position of a tire inflation valve and/or of a tire pressure measurement sensor (TPMS). Alternatively or additionally, the AI-based model is configured to automatically detect at least one dimension of the wheel, tire or rim, for instance their width, diameter, contour, and the like. Alternatively or additionally, the AI-based model is configured to identify the shape and/or the kind of the wheel, rim or tire.

Alternatively or additionally, the AI-based model is configured to automatically count the number of spokes on the wheel rim.

Alternatively or additionally, the AI-based model is configured to automatically detect wheel and/or rim and/or tire damage.

Alternatively or additionally, the AI-based model is configured to automatically detect the presence and/or the position of the at least one servicing tool.

Alternatively or additionally, the AI-based model is configured to automatically determine when an operator is performing potentially unsafe actions.

According to an implementation, the apparatus for servicing a motor vehicle wheel or rim is a tire changer. In some implementations, the at least one servicing tool is a tire fitting and/or removal tool. Alternatively or additionally, an actuator device can be provided operating the at least one fitting or removal tool. Alternatively or additionally, a sensor device may be also connected with the control unit providing the position of the at least one fitting and/or removal tool. The sensor device comprises for example sensors, transducers, encoders and/or potentiometers.

According to an alternative implementation, the apparatus for servicing a motor vehicle wheel or rim is a wheel balancer. Alternatively or additionally, the at least one servicing tool is a shaft for supporting and rotating the wheel and/or the rim.

Particularly in implementations in which the apparatus is a wheel balancer, the step of applying the AI-based model may comprise any one or more of the steps of identifying a shape and/or kind of the wheel, rim and/or tire. In some implementations, the AI-based model is configured to determine any one or more of the type of rim, and/or the inner and outer rim shape, and/or the width and/or the diameter of the rim, and/or the radial and/or lateral rim runout, and/or bulges and/or depressions of the tire sidewall, and/or the presence and/or type and/or position of wheel weights attached to the rim, and/or improper bead seating, and/or improper wheel centring, and/or the tread depth, and/or the radial runout of the tire tread, and/or the tire geometrical conicity, and/or the tread flatspots, and/or an irregular tire tread wear. Identifying any one or more of these wheel and/or rim and/or tire features using the AI-based model may advantageously prevent errors stemming from the otherwise manual determination and/or input into a control unit of the wheel balancer.

Alternatively or additionally, the vision system is connected with the control unit and the control unit is connected with the at least one servicing tool. In some implementations, only one control unit is thus provided performing the mentioned functions. This may advantageously which save costs in manufacturing the apparatus for servicing a motor vehicle wheel or rim.

According to an alternative implementation, a second control unit is provided, the second control unit being connected with the vision system and with the first control unit that is connected with the at least one servicing tool.

Alternatively or additionally, the control unit is in network connection with a remote information system, that is, an information system that is not directly physically attached to the apparatus for servicing a motor vehicle wheel or rim. In some implementations, the remote information system is a cloud-based system. Alternatively or additionally, the remote information system comprises one or more databases.

It has to be understood that any disclosure herein in the context of apparatuses or methods for servicing a motor vehicle wheel or rim likewise applies to apparatuses or methods for servicing a motor vehicle.

In some implementations, the apparatus or method for servicing a motor vehicle is a wheel alignment procedure or system. In some implementations related to wheel alignment, the step of applying an AI-based model comprises the sub-step of determining one or more wheel alignment parameters, including but not limited to any one or more of a primary wheel alignment angle and/or a secondary wheel alignment angle. The primary wheel alignment angles are a front and rear camber angle (left and right), a front caster angle (left and right) and a front and rear toe angle (left, right and total). The secondary wheel alignment angles include but are not limited to a steering axis inclination angle, a wheelbase difference, a track width difference and a frame angle. In some implementations, the step of applying an AI-based model comprises the sub-step of identifying one or more wheels in images covering at least a portion of the vehicle. In some implementations, the step of applying an AI-based model comprises the sub-step of identifying the position and/or orientation of one or more wheels in images covering at least a portion of the vehicle. In some implementations, the method further comprises the step of recommending a specific wheel alignment procedure based on the determined wheel alignment parameters. In some implementations, the step of recommending a specific wheel alignment procedure is also performed by an AI-based model.

In some implementations, the apparatus or method for servicing a motor vehicle is an apparatus or method for calibration of ADAS (advanced driver assistance systems) sensors. In some implementations related to ADAS sensor calibration, the method further comprises creating one or more images covering at least a portion of the vehicle and at least a portion of the apparatus for ADAS sensor calibration. In some implementations, the step of applying an AI-based model comprises the sub-step of determining the presence and/or absence of one or more calibration targets. In some implementations, the step of applying an AI-based model comprises the sub-step of determining the presence and/or absence and/or position and/or orientation of one or more ADAS sensors of the vehicle. In some implementations, the step of applying an AI-based model comprises the sub-step of determining a position and/or orientation of the one or more calibration targets relative to the vehicle, including but not limited to a position and/or orientation relative to one or more ADAS sensors of the vehicle. In some implementations, the method comprises the step of determining if the relative position and/or orientation of the one or more calibration targets is within predetermined limits suitable for performing an ADAS sensor calibration procedure.

In some implementations, the apparatus or method for servicing a motor vehicle is an apparatus or method for vehicle body damage detection. In some implementations related to collision damage detection, the step of applying the AI-based model comprises the sub-step of identifying the presence or absence of vehicle body damage in the acquired images covering at least a portion of the vehicle. In some implementations, the step of applying the AI-based model comprises the sub-step of determining a size and/or location and/or severity of vehicle body damage. In some implementations, the method further comprises the step of recommending a specific repair procedure based on the determined size and/or location and/or severity of vehicle body damage. In some implementations the step of recommending a specific repair procedure is also performed by an AI-based model. In the context of the present disclosure, vehicle body damage can include but is not limited to weather or other environmental damage (such as faded or cracked paint; hail dents; or corrosion), collision damage (such as cracked or shattered windshields or windows; dented, buckled or scratched panels or other car body parts; missing panels or other car body parts; activated airbags), vandalism damage (such as scratch marks; graffiti; fire damage). In some implementations, vehicle body damage is identified through comparing features of the vehicle (identified from the acquired images using the AI-based model) with features of a comparable vehicle. In some implementations, the features of the comparable vehicle are retrieved from a computer readable memory.

In some implementations of the motor vehicle servicing method or apparatus, the step of applying the AI-based model comprises the sub-step of identifying make and/or model of the vehicle. In some implementations, specific servicing actions (including but not limited to repair procedures; wheel alignment procedures; ADAS calibration procedures) can be recommended based on the identified make and/or model.

The aspects of the present disclosure will be described in greater detail hereinafter by means of particular implementations by way of example with reference to the Figures in which:

DETAILED DESCRIPTION OF THE DRAWINGS

Figure 1:
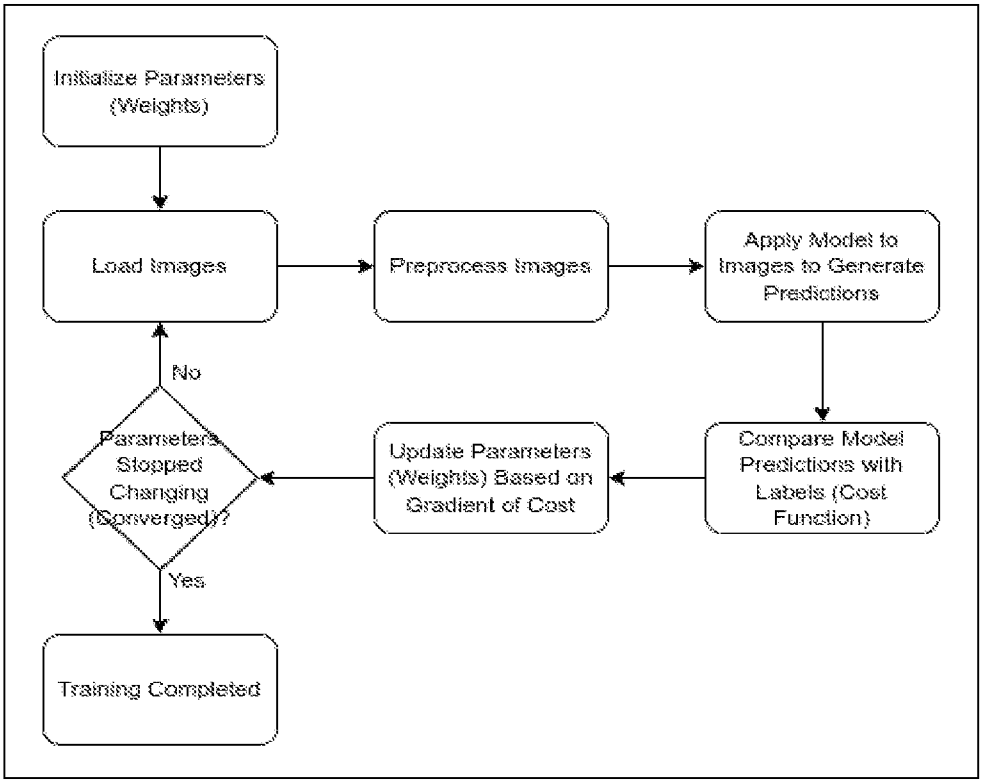
FIG. 1 shows a high-level block function diagram flow of a training process of an AI-based model according to a particular implementation of the method for servicing a motor vehicle wheel or a motor vehicle rim first aspect.

In the description below, any expressions used, such as "right-hand", "left-hand", "above", "below", "upper", "lower", "horizontal", "vertical" and the like, are used merely for illustrative purposes and refer to the particular arrangement of the elements present in the attached figures and therefore are not limiting in any way.

Particular Fields of Application of the Disclosed Technology

In the field of motor vehicle wheels and tires workshops, various equipment for servicing a motor vehicle wheel or a motor vehicle rim are usually available and used by an operator to carry out the motor vehicle wheel or motor vehicle rim servicing or maintenance procedure. Examples of wheel or rim servicing equipment include, for instance, tire changers and wheel balancers. Both tire changers and wheel balancers are equipped with various wheel and/or rim servicing tools that are used to perform a wheel or rim servicing procedure. Such procedures are different depending whether the servicing procedure is carried out on a tired wheel (in other words, a rim and tire assembly) or on a rim only (i.e. a rim without a tire mounted on it). Furthermore, in the course of the wheel or rim servicing procedure, the tools need be positioned in different places, in order to complete the servicing procedure in a correct manner and also in order to avoid any damage to the rim, tire, or to the servicing tools.

Tire changers, as the name implies, are generally used in order to remove the tires from the rims and/or to mount said tires on respective rims. Wheel balancers are generally used to determine the presence of static and/or dynamic unbalances of rims or wheels, and to help the operator fix such unbalances.

In the case of a tire changing operation, before being able to remove a tire from a rim it is required to perform so-called bead breaking of the tire, namely it is required to obtain the complete separation of both the beads of the tire from the rim, using a special bead breaker tool. Only after this operation is it possible to then proceed with the actual operation of removing the tire from the rim, generally using suitable mounting/demounting tools.

The bead breaker tools may be of different types, for example of the blade or paddle type, roller type, disc type, etc. Disc tools are particularly widespread on more efficient and modern tire-removal machines. These disc-type bead breaker tools usually comprise a rotatable disc which, sometimes, but not always, is shaped with a frustoconical form and is mounted idle on a support arm. The disc of the bead breaker tool, or bead breaker disc, is placed in contact with the sidewall of the tire of a wheel which is fixed on a rotating support. With rotation of the support, the wheel, which is rigidly fixed thereto, will also start to rotate, allowing the bead breaker tool to operate on the tire along an entire circumferential revolution and therefore separate completely the bead of the tire from the rim.

In order to complete successfully a bead breaking operation in a short time and without damaging either the sidewall of the tire, the wheel rim or the bead breaker tool itself, it is important to position correctly the tool both relative to the rim and relative to the tire.

In particular, with the wheel stationary, deflated and mounted on the support, the bead breaker disc is moved towards the edge of the rim, usually without touching it however, and instead brought into contact with the sidewall of the tire.

In order to perform the actual bead breaking process, the bead breaker disc is in some implementations pivoted or nevertheless advanced towards the axis of rotation of the wheel, so as to be inserted between the edge of the rim (sometimes, however, touching it) and tire, thereby starting the gradual separation of the bead of the tire from the rim, while rotation of the tired wheel in the meantime is started.

In order to complete the bead breaking process, it is then usually necessary, during the course of the process itself, to move the bead breaker tool also parallel to the axis of rotation of the wheel, with the tired wheel still rotating, so as to allow the bead breaker disc to interact better with the sidewall of the tire and/or with the rim channel.

Once this process has been completed and both the beads separated, the tire may be completely removed from the rim, usually with the aid of further demounting tools, such as levers, hooks, etc.

Sometimes, the demounting tools are combined with respective mounting tools, or special mounting/demounting tools may be provided, i.e. tools which may perform both the mounting and demounting functions.

These mounting and/or demounting tools, in the more modern and efficient tire-removal machines, are often also able to pivot towards and/or away from the axis of rotation of the wheel, so as to interact better with the sidewall of the tire and/or with the rim channel.

As mentioned, if this not performed properly, both the bead breaking process and the subsequent tire removal process may not be effective or may not result in complete separation of the tire beads from the rim or may result in damage to the tire, rim or both of them. Since most modern wheels are equipped with tire pressure monitoring sensors (TPMS), usually located in proximity of the tire inflation valve, it is also important not to procure any damage to such TPMS sensors (and/or to the inflation valves).

Wheel balancers, in general, fall into two categories, namely, dynamic and static balancers. Dynamic balancers fall into two sub-categories, namely, slow speed and high speed balancers. In slow speed dynamic balancers, the wheel is mounted on a main shaft of the balancer, and in general, is rotated by hand. In high speed dynamic balancers, the main shaft onto which the wheel is attached, in general, is rotated by a drive motor. Tires and rims may both present various unbalances.

Especially when balancing alloy wheels or rims, it is important for aesthetic purposes that the balance weights should be attached to the alloy rim hub out of sight when the wheel is attached to a vehicle. For this and other reasons, clip-on weights of the type which are typically attached to the inner and outer rims of steel wheel hubs are unsuitable for balancing alloy wheels. Weights which are generally used in balancing alloy wheels are referred to as stick-on weights, and are provided with a self-adhesive coating for bonding the weight to an inner surface of the wheel hub, which defines a wheel well. Typically, the weights are attached to the surface defining the well at locations in two spaced apart balancing planes which are located between the spokes of the wheel hub and the inner rim of the wheel hub, in other words, on the inner side of a plane defined by the spokes of the wheel hub. In this way, when the wheel is attached to the vehicle the weights, in general, are largely out of sight.

Wheel balancers are known which comprise a tool for applying balance weights in the appropriate positions in the balancing planes in the wheel hub. In such wheel balancers, each balance weight is placed in a clamp at a free end of the tool which is then extended until the balance weight in the clamp coincides with the balancing plane. Other wheel balancers are known which comprise tools for indicating the angular position relative to the wheel axis at which the correcting balance weight is to be located. All wheel balancers, in general, comprise clamping means for securely and reversibly fixing a wheel rim to a rotating shaft.

In case of both tire changers and wheel balancers, it is therefore important to be able to carry out different servicing procedures depending whether such procedure is to be applied to a rim only or to a tired wheel, and also to be able to adequately control the position of the tools at the beginning and during the wheel or rim servicing procedure.

AI-Based Models

In this respect, machine learning and/or Artificial Intelligence (ML/AI) techniques or models can be applied to many measurement systems to provide new capabilities and functionality for workshop equipment users and operators, especially in conjunction with image and video data. Tire changers and wheel balancers equipped with co-located cameras are examples of garage workshop equipment that can benefit from ML/AI capabilities.

ML/AI capabilities, also known as “tasks”, are often combined together and are also often combined with various computer vision techniques to provide more detailed information for the end user or the operator. The following list of ML/AI models and tasks is not exhaustive and is only intended to provide examples for the type of activities that can be performed with cameras and machine learning methods, in the context of the present disclosure.

The AI-based model according to the present disclosure may comprise an object classifier, that is a machine learning model which categorizes input images as belonging to a category that it has been trained to recognize. A classifier takes an image as an input and generates a class label prediction for that image (which object class is contained in the image). Commonly used types of classifiers include decision trees, K-NN, SVMs, and a variety of deep learning-based methods. Some of the more commonly used deep learning methods include ResNet, VGG, Inception, among others.

The AI-based model according to the present disclosure may comprise an object detector (also referred to as "object recognition model" or "object locator" or "object identifier") . Object detectors are a very important and commonly used type of machine learning model. As implied by its name, an object detector is a machine learning model which detects objects of interest in images-which types of object are present in the images, and where they are located within the images. The objects of interest are localized as 2D rectangular bounding boxes in pixel coordinates. Commonly used object detectors include the YOLO family, R-CNN, and MobileNet, among many others.

The AI-based model according to the present disclosure may comprise an instance segmentation model. An instance segmentation model is similar to an object detector—it determines which objects of interest are present in images, and where they are located in the images. The difference, however, is in how the objects are localized. Instance segmentation models localize objects of interest on a per-pixel basis-that is, they produce a "mask" that assigns class labels to every pixel in an image, if such objects are detected. Instance segmentation models are able to provide much more detailed object localization within images, which is beneficial in some applications.

There are various ways of estimating 3D coordinates of points in a scene from a single camera. This category of models is commonly referred to as monocular depth estimation. Some of these methods involve machine learning models which estimate depth from a single camera, using perceptual cues such as color and shading. These models sidestep the difficult point correspondence step that is required in stereo vision algorithms, and they function with a single camera in a fixed position. As a tradeoff, these models tend to not provide as much measurement accuracy as stereo vision models. Some examples of such models include DepthNet, Monodepth, MiDAS, and DepthGAN. All of these monocular depth estimation models can be easily implemented in the AI-based model, when the vision system comprises a single camera.

If an object is viewed by two or more camera views, and the geometry between the two camera views is known, it is possible to use techniques of stereo vision to measure the 3D coordinates of corresponding points in images. The most difficult component of implementing stereo vision is the choice of stereo matching algorithm that is used to match corresponding points from the two or more camera views. There are many corresponding point matching techniques: SGBM, graph cuts, and variational matching, among many others. In addition, many deep learning algorithms have been created recently which in many scenarios offer improved stereo matching. Some of these methods include: DispNet, GC-Net, EdgeStereo, and HSMNet, among many others. All of these stereo matching ML/AI techniques can be easily implemented in the AI-based model, when the vision systems comprises two or more cameras.

The AI-based model according to the present disclosure may comprise a Keypoint (Landmark Point) Detector and Matcher. For many applications of interest, it is valuable to detect and track naturally occurring textured points of interest ("keypoints", also known as "landmark points") that are present in images. Some uses for these textured points of interest include image stitching, sparse stereo point matching, and camera orientation estimation. Some commonly used keypoint detectors and matchers include SIFT, SURF, and ORB. Modern deep learning-based methods such as SuperGlue, SuperRetina, GLAMpoints, and SiLK provide superior performance in many scenarios.

The AI-based model according to the present disclosure may comprise an activity recognition model. Activity recognition models are used to determine what activity is occurring and when, often in the context of user behavior. These models typically process temporal streams of data and/or images from cameras, and sometimes incorporate data from additional sensors as well (accelerometers, gyroscopes, microphones, among others). Some commonly used activity recognition models include 3D ResNet, 2D ViT, and ConvLSTM.

There are many possible types of machine learning models which can be used within the context of servicing a motor vehicle wheel or a motor vehicle rim. The different types of models are different in how they transform data into features and in what parameters they learn as part of the training process. Despite these differences, there exists significant overlap and commonality between the different model types. In the following, the more commonly used machine learning model types, that may be easily incorporated into the AI-based model, will be briefly described. Such a list is however not exhaustive.

As a first example, the AI-based model according to the present disclosure may comprise a Deep Neural Networks (Deep Learning) model. In deep learning, input data is fed through a cascade of matrix multiplications in multiple "hidden" layers, with a nonlinear transformation applied after each matrix multiplication. The output of the matrix multiplication and nonlinear transformation in each "hidden" layer is then fed into the next layer in the data processing chain. In modern deep neural networks, there can be hundreds of such "hidden" layers containing such nonlinear transformations. This nonlinearity allows for the characterization of phenomena of tremendous variety and complexity-much more so than in competing machine learning methods. This ability to identify and characterize phenomena of tremendous complexity tends to make deep neural networks more capable of performing the task at hand, which is why deep neural networks have proliferated over machine learning methods in recent years. The trainable parameters of deep neural networks are called "weights", and they are stored as the matrices in each "hidden" layer of the deep neural network. During the training process, the weights are iteratively adjusted until the resultant deep neural network predictions are optimized (i.e. as good as they can get, for the available data). There are some downsides to deep neural networks. The large number of trainable parameters allows for the characterization of tremendous complexity, but it also imposes heavy burdens. The large number of trainable parameters tends to require more computational resources to generate model predictions—there are typically large numbers of matrix multiplications and nonlinear transformations. The computational burden is often of such a magnitude that specialized computational hardware must be used to generate model predictions in sufficiently short time windows. The large number of trainable parameters also tends to require a large quantity of training data. To achieve the superior performance afforded by many deep learning models, one must typically provide much larger datasets when training models.

The AI-based model according to the present disclosure may comprise an SVM (Support Vector Machine). In an SVM model, raw input measurements are transformed to points in high dimensional feature spaces. The idea is that points from different classes should be geometrically separated in this high-dimension feature space—in the training process, the hyperplanes that optimally separate different classes in this feature space are calculated. That is, points on one side of the hyperplane are assigned to one class, and points on the other side of the hyperplane are assigned to another class. The transformation from raw input measurement to feature space can be a linear or a nonlinear transformation. SVMs at their core are geometric algorithms, and they perform best when the input features are commensurate. For incommensurate features (those of a fundamentally different nature), however-a quantity like "object width" as one feature, and "object texture" as another-SVM performance tends to lag other methods.

The AI-based model according to the present disclosure may comprise a naive Bayesian model. In such a model, input measurements are converted to a vector of features, and Bayesian statistics are computed on such feature vectors so as to optimally assign class labels based on the statistical distribution of features.

The AI-based model according to the present disclosure may comprise a decision tree. In decision trees, input measurements are converted to a feature vector. Based on the quantities of the feature vector elements, the measurement is then categorized as belonging to one of various classes based on a cascading network of tree-like nodes. Similar clusters of feature vector elements aggregate in the same final branches ("leafs") of the decision tree.

Despite the tremendous variety of machine learning models described above, and the wide variety of tasks performed by such models, all follow the same basic data processing steps in both the "training" and "inference" stages.

In the training phase, the parameters of the model are iteratively updated and optimized so as to minimize a "cost function" (also known as a "loss function"). The high-level training process is depicted in FIG. 1. The key is that the training process is an iterative optimization, with model parameters updated at each iteration.

The Initialize Parameters step denotes when initial values for the parameters are assigned. Often, parameters are assigned randomly (within bounds). Load Images is the process step when data is loaded. For training on large datasets, it is not possible to load and store all images in RAM—it is often necessary to load images on the fly. After images are loaded, the next step is to Preprocess Images. In this step, images are typically transformed into the format expected by the machine learning model, which can include an explicit transformation of the data into features.

After image preprocessing, the next step is to apply the current model (with the current parameter estimates) to the image data to generate a prediction. The output of the model prediction step depends on the task that is being trained for—for example, a classifier will generate predictions of class labels; an object detector will generate class predictions and bounding box locations for all objects that it is being trained to detect; and so on.

The next step in the model training process is to compare the model predictions with the ground-truth labels. Predictions that produce larger errors are assumed to require larger changes to their model parameters. The cost function is what calculates the error of the model predictions—it must penalize incorrect model predictions. The cost function is chosen to fulfil the task of interest. For example, in a classifier, the goal is to correctly categorize images as belonging to the labelled classes. For an object detector model, the cost function must apply penalties not only to incorrect class predictions, but also to less accurate bounding box localizations of detected objects.

After calculating the "cost" of the model for its current estimates of the parameters, the next step is to update the model parameters based on the prediction errors. Parameters that produce larger prediction errors receive larger updates. In deep neural networks, this process of updating weights based on their contribution to prediction error is called "backpropagation" (backwards propagation of error). It is based on the principle of gradient descent optimization. Other model types use related methods to adjust and optimize parameters based on prediction errors. The net result of the Update Parameters step is that model parameters are updated such that improved predictions should result in the next iteration.

After model weights have been updated, a convergence check is performed. If one or more convergence criteria are satisfied, the training process is stopped, and the model parameters (weights) are saved for later use in the Inference Phase. Typically, model training stops when prediction errors stop improving. If after the Update Parameters step, the decision is made to keep training, the entire process repeats, sometimes for hundreds of iterations, until the model training process satisfies convergence conditions.

Figure 2:
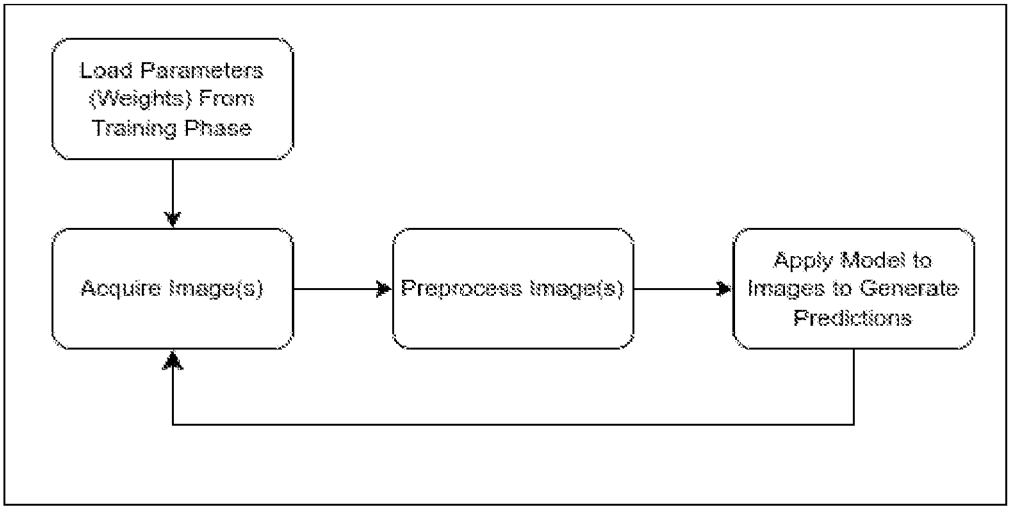
FIG. 2 shows a high-level block function diagram flow of an inference process of an AI-based model according to a particular implementation of the method for servicing a motor vehicle wheel or a motor vehicle rim of the first aspect.

The Model Inference phase is conducted after a model has been trained and shown to provide satisfactory performance. In the model inference phase, the model parameters are held fixed and the model is used to generate runtime predictions. Often, model inference is performed on a different device than what was used to train the model. The inference loop is depicted in FIG. 2.

The first step in the model inference process is to load the model parameters that were "learned" during the training phase. After the model parameters are loaded, a steady-state runtime loop is entered. In this runtime loop, image(s) are acquired, preprocessed in the same manner as in the training phase, and then the AI-based model is applied to the images to generate model predictions. There are no further steps in the high level inference flow—the model predictions are used by the larger control application.

With the methods described above, it is possible to train an AI-based model for any of the purposes described elsewhere herein.

Exemplary Implementations of the Disclosed Technology

Figure 3:
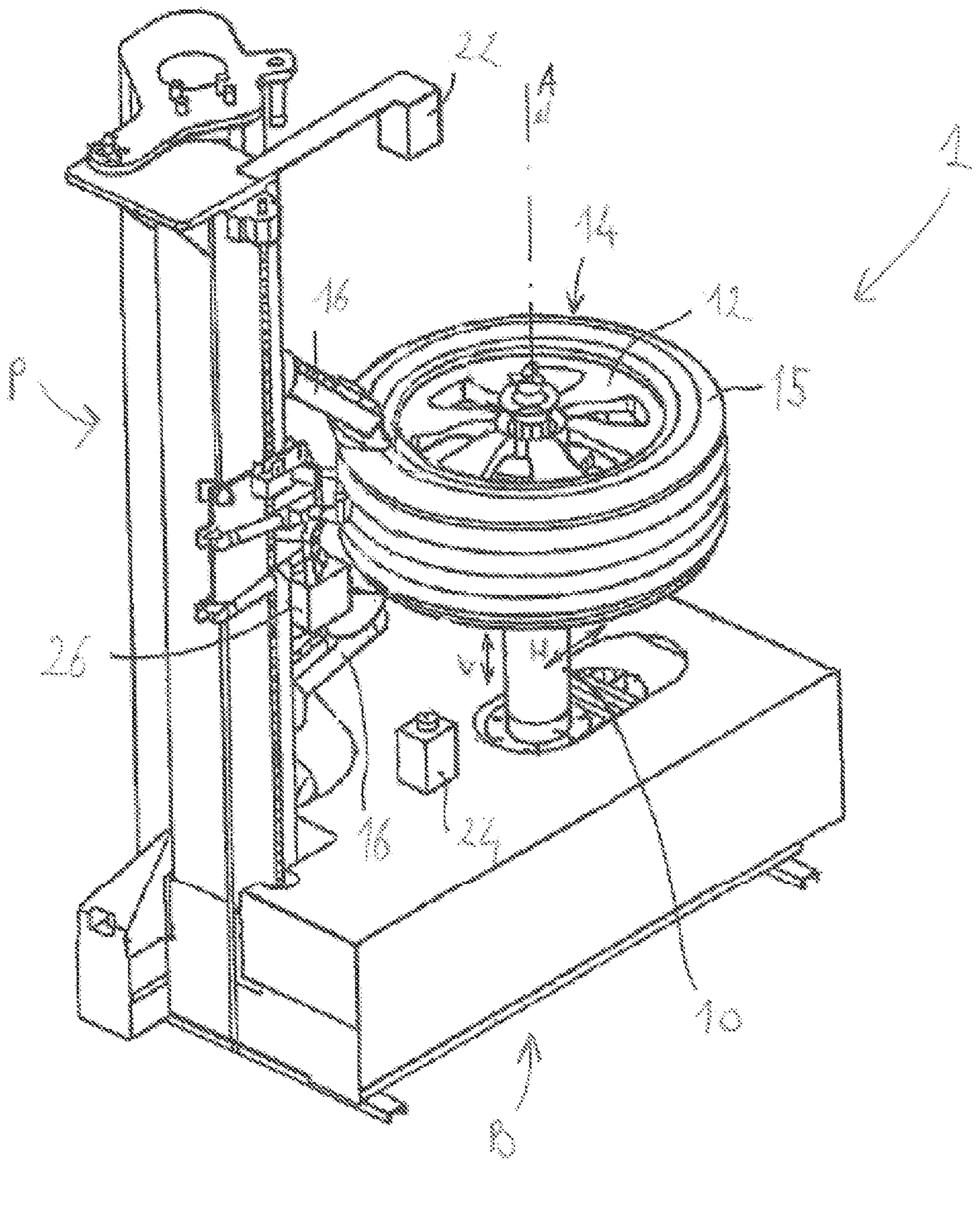
FIG. 3 shows a simplified view of a first implementation of an apparatus for servicing a motor vehicle wheel or a motor vehicle rim, and namely a tire changer, according to the second aspect.

With reference now to FIG. 3, a first implementation of an apparatus for servicing a motor vehicle wheel or a motor vehicle rim is shown. The apparatus of FIG. 3 is a tire changer. The tire changer 1 comprises a machine base B and a wheel or rim receiving means 10 which is movable in a horizontal direction (as shown with arrow H) and in a vertical direction (as shown with arrow V) and to which a rim 12 of a motor vehicle wheel 14 can be fixed. The motor vehicle wheel 14 further comprises a tire 15. The receiving means 10 can have a receiving bar, a wheel plate on which the rim 12 is placed, or clamping arms on which the rim 12 is supported, or another support arrangement. The rim 12 is non-rotatably connected to the receiving means 10 by fixing means, in particular clamping means. The receiving means 10 is caused to rotate by means of a rotary drive device (not shown) which can be in the form of an electric motor, around rotational axis A.

The illustrated implementation also includes at least one fitting or removal tool 16 mounted on a support post P extending vertically from the machine base B which, when the motor vehicle wheel 14 is arranged horizontally, are caused to come into contact with side walls of the tire 15 from below and from above in the proximity of tire beads that, when the motor vehicle tire 15 is in the fitted condition, lie behind two lateral rim beads of the rim 12.

The fitting or removal tools 16 can be operated by an actuator device 17 (not shown). The actuator device 17 is connected with a control unit 18 (not shown), the control unit 18 being configured to send commands to the actuator device 17 to change the position of the fitting or removal tools 16. The control unit 18 is further connected with a sensor device 20 (not shown) comprising for example sensors, transducers, encoders and/or potentiometers and providing the position of the fitting or removal tools 16 and/or of the wheel or rim receiving means 10.

At both sides of the rim 12 or of the wheel 14 (that means in the illustrated implementation at the top side of the rim 12 or of the wheel 14 and at the underside of the rim 12 or of the wheel 14) cameras 22 and 24 are positioned. A further camera 26 is disposed on a support movable in a vertical direction and is oriented substantially in a horizontal direction. The cameras 22, 24, 26 are part of a vision system 21 and can be pivotable.

Figure 5:
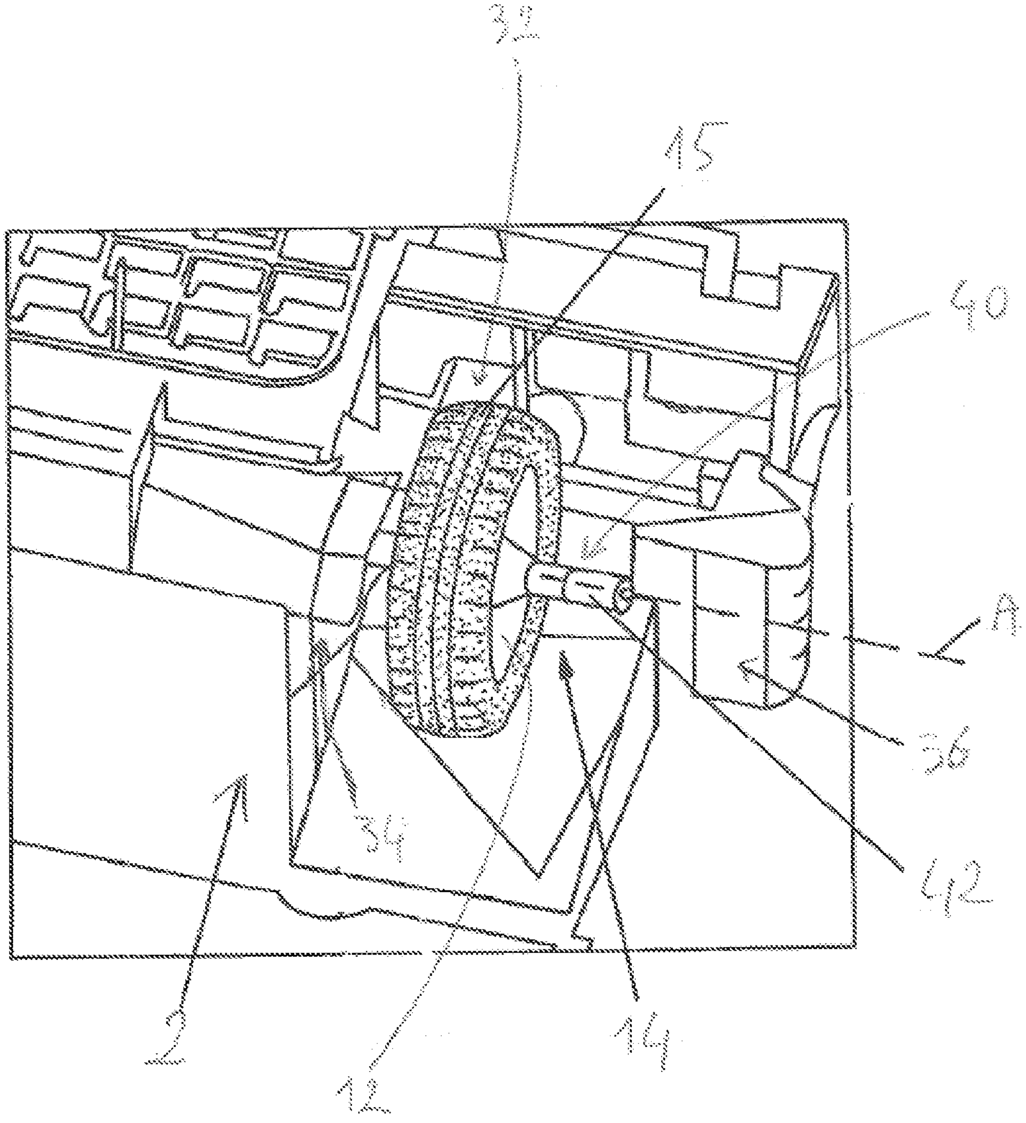
FIG. 5 shows a simplified view of a third implementation of an apparatus for servicing a motor vehicle wheel or a motor vehicle rim, and namely a wheel balancer, according to the second aspect.
Figure 6:
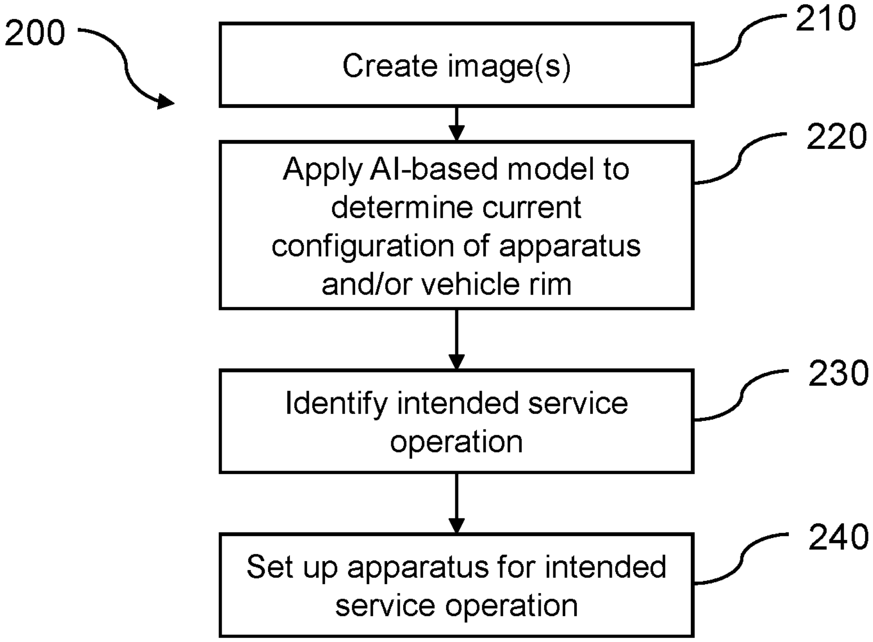
FIG. 6 provides a schematic view of a particular implementation of method according to the first aspect.

The cameras 22, 24, 26 create images, in particular digital images, of their respective field of view, corresponding to step 210 in method 200 shown in FIG. 5. As the cameras 22, 24, 26 are directed towards the region in which the wheel 14 is positioned, and in which the fitting or removal tools 16 operate and an equipment operator performs their duties, images of the rim beads at the radial outer surface of the rim 12 and essentially of the rim contour in the region of the rim beads can be produced.

The vision system 21, i.e. the cameras 22, 24, 26, are connected to the control unit 18 to which the actuator device 17 for the fitting or removal tools 16 and the sensor device 20 are also connected. The cameras 22, 24, 26 can send electrical signals to the control unit 18 which represent created images.

Based on the digital images acquired by the vision system 21, the control unit 18 is configured to run an AI-based model to determine whether a tire 15 is fitted on the rim 12, corresponding to step 220 in method 200 shown in FIG. 5. In other words, the AI-based model is able to determine whether a wheel, i.e. a tire and rim assembly, is mounted on the wheel or rim receiving means 10 or else whether only a rim, without a tire fitted to it, is mounted on the wheel or rim receiving means 10. In particular implementations, the AI-based model comprises an object classifier, object identifier and/or object locator trained to determine the presence and/or location of a tire in the images acquired by the vision system. Of course, step 220 can alternatively or additionally any one or more of the (sub-)steps of applying an AI-based model described elsewhere herein. Depending whether a wheel or else a rim only is mounted on the wheel or rim receiving means 10, the control unit 18 is configured to correspondingly set the tire changer 1 in an autonomous manner. First, the intended service operation is identified (step 230 in FIG. 5), and then the apparatus is set up for the intended service operation (step 240 in FIG. 5). Specifically, depending whether a wheel or else a rim is mounted on the wheel or rim receiving means 10, the intended service operation can be identified as tire mounting or tire removal. Based on the intended service operation, the control unit 18 sends corresponding commands to the actuator device 17, so that the fitting or removal tools 16 are moved in a desired position to correctly start the tire mounting or tire demounting procedure.

According to an implementation, once the presence or absence of a tire 15 fitted on the rim 12 is determined, the control unit 18 is configured to set all actuator devices of the tire changer, as well as all servicing tools, so that they are moved in respective desired positions, to correctly start the tire mounting or tire demounting procedure. According to another implementation, the control unit 18 is configured to set and move all actuator devices of the tire changer, as well as all servicing tools, not only to move them to a desired initial position (or predefined position associated with a corresponding desired configuration as described elsewhere herein) before the wheel servicing procedure is started, but also during the wheel serving procedure, up until such procedure is completed. In other words, different tire servicing processes can be automatically completed by the control unit 18, depending on the presence or absence of the tire mounted on the rim, as determined by the AI-based model.

According to an implementation, the control unit 18 is configured to move the wheel or rim receiving means 10 in a horizontal direction (as shown with arrow H) and/or in a vertical direction (as shown with arrow V), so that the wheel or rim may be also moved in a desired initial position (or predefined position associated with a corresponding desired configuration as described elsewhere herein) and/or during the tire servicing procedure, depending on the presence or absence of the tire mounted on the rim, as determined by the AI-based model.

According to another implementation, the AI-based model is capable of identifying the dimensions, shape, contour, and type of both rims and tires, so that to improve the accuracy in setting the tire changer either before the wheel or rim servicing procedure is started, or else during the wheel or rim servicing procedure.

According to another implementation, the AI-based model is capable of identifying the presence and position of wheel or rim features such as, for instance, the presence and position of a tire inflation valve and/or of a tire pressure measurement sensor (TPMS). Knowledge of presence and position of the tire inflation valve and/or of the TPMS sensor ensures that the tire fitting or removal tools 16 avoid any collision with such tire inflation valve and/or TPMS sensor during the tire servicing procedure, so that to prevent damages to both the tire inflation valve and/or the TPMS sensor or to the fitting or removal tools 16. In particular implementations, the AI-based model comprises an object classifier, object identifier and/or object locator trained to determine the presence and/or location of a wheel or rim feature (including but not limited to a TPMS sensor and/or a tire inflation valve) in the images acquired by the vision system.

In order to remove a tire 15 with the fitting or removal tools 16, the fitting or removal tools 16 are guided along the rim contour without contacting the rim contour. For this purpose, the cameras 22, 24, 26, which are directed to the area in which the wheel 14 is positioned and the fitting or removal tools 16 operate, create digital images of the wheel surface and the fitting or removal tools 16. Corresponding signals are sent to the control unit 18. The control unit 18 sends a command to the actuator device 17 to approach the fitting or removal tools 16 to the rim contour, the sensor device 20 providing the actual position of the fitting or removal tools 16. Such a command reads e.g. as follows: "Move the fitting or removal tools X cm to the left". Afterwards, the cameras 22, 24, 26 create further images of the wheel surface and the fitting or removal tools 16. Corresponding signals are sent to the control unit 18. The control unit 18 correlates the commands sent to the actuator device 17 with the signals (i.e. digital images) received from the cameras 22, 24, 26, that means the control unit 18 conducts, thanks to the AI-based model, an image interpretation. Thereby, it compares the initial signals of the cameras 22, 24, 26 with the signals of the cameras 22, 24, 26 after movement of the fitting or removal tools 16, respects the command sent to the actuator device 17 and determines the command which is necessary to approach the fitting or removal tools 16 to the rim contour. The method is repeated as long as the fitting or removal tools 16 lies in the desired position relative to the rim contour. The cameras 22, 24, 26 create a plurality of images (e.g. every 40 ms to 100 ms) during the operation. Thus, in the tire removal operation, when the motor vehicle wheel is rotated about the wheel axis through at least 360° the fitting or removal tools 16 can be approached to the rim contour.

Furthermore, with the cameras 22, 24, 26, the presence of an operator can be discovered and corresponding signals can be sent to the control unit 18. After correlation of several signals, a dangerous situation for the operator can be detected and the method can be stopped. For example, a dangerous situation may be one in which the operator is in danger of colliding with any of the servicing tools, particularly during automated movement of the servicing tools. The method and apparatus can be used to avoid collisions between the fitting or removal tools and the wheel, rim and/or tire, between various tools (i.e. fitting or removal tools and hold-down devices). Further, the method and apparatus allows stopping the method in case of potential damage for the wheel, the tire and/or the operator.

Figure 4:
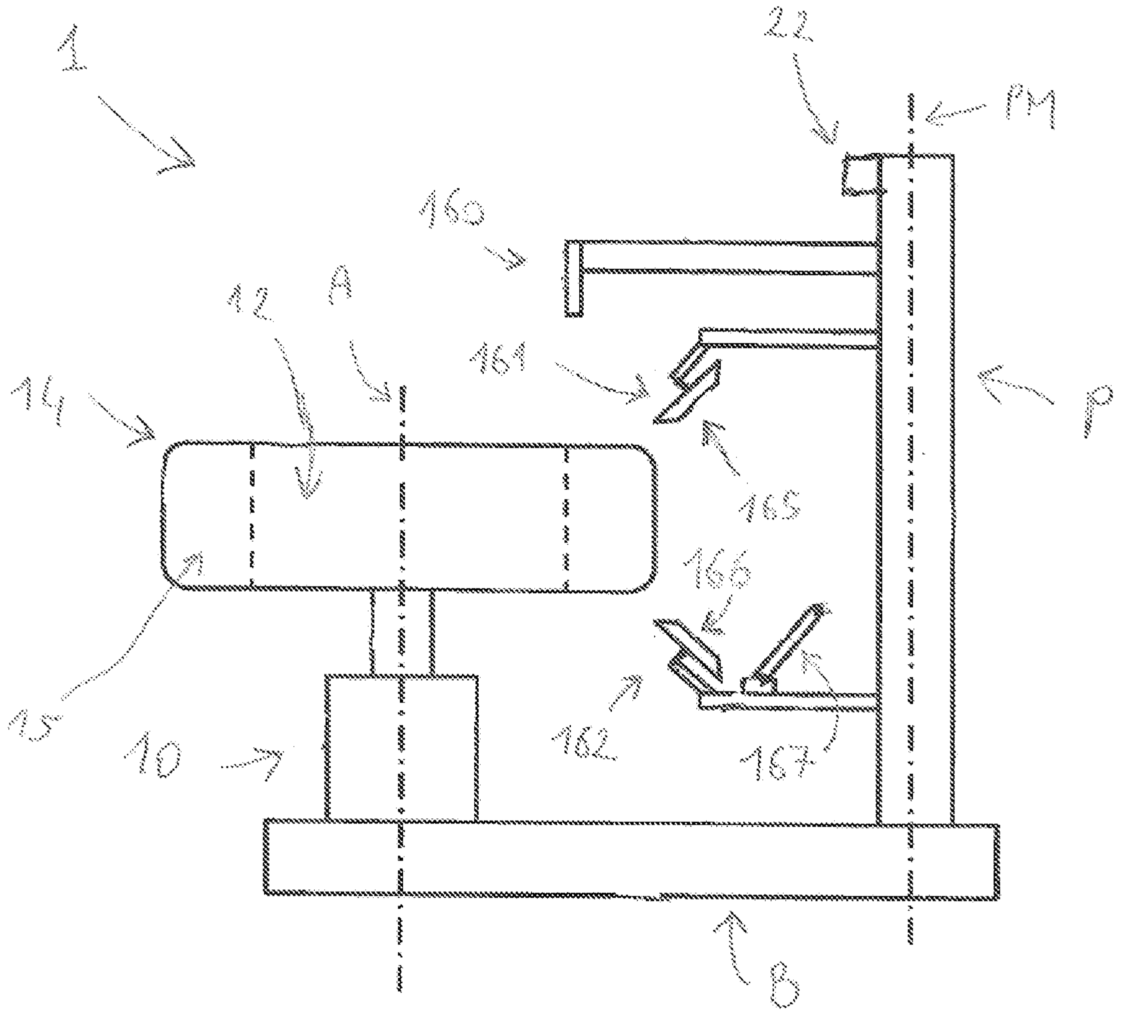
FIG. 4 shows a schematic view of a second implementation of an apparatus for servicing a motor vehicle wheel or a motor vehicle rim, and namely a tire changer, according to the second aspect.

With reference to FIG. 4, a second implementation of an apparatus for servicing a motor vehicle wheel or a motor vehicle rim is shown. The apparatus of FIG. 4 is a tire changer. Tire changer 1 also comprises a machine base B and a wheel or rim receiving means 10 to which a rim 12 of a motor vehicle wheel 14 can be fixed. The motor vehicle wheel 14 further comprises a tire 15. Similarly to the first implementation, the receiving means 10 can have a receiving bar, a wheel plate on which the rim 12 is placed, or clamping arms on which the rim 12 is supported, or another support arrangement. The rim 12 is non-rotatably connected to the receiving means 10 by fixing means, in particular clamping means. The receiving means 10 is caused to rotate by means of a rotary drive device (not shown) which can be in the form of an electric motor, around rotational axis A.

The tire changer 1 also comprises a vertical support post P, extending from the machine base B in the direction of vertical center line PM, on which various servicing tools, for instance fitting/removal tool, are mounted. All of these tools can be moved in both the vertical and/or the horizontal direction and are in some implementations driven by respective actuators (not shown). At least some of the tools can also be made to rotate around a direction parallel and/or perpendicular to the support post center line direction PM.

The servicing tools may comprise a mounting/demounting tool unit 160 and/or a first (or upper) bead breaker 161 and/or a second (or lower) bead breaker 162. The first and second bead breakers generally comprise respective first and second bead breaking discs 165, 166. The second bead breaker 162 may also comprise a mounting support tool 167. All these tools are for example illustrated in EP 2 949 488 A1. The tire changer may also comprise further tools, for instance various helper tools such as bead and/or tire pushing devices (not shown).

The position of the servicing tools need be adjusted depending whether the servicing operation is to be carried out on a rim only or on a tired wheel, as well as depending on the position of the other tools that are present on the tire changer. To this end, the tire changer 1 comprises a vision system 21 comprising at least one camera 22 mounted on the support post P. The field of view of the vision system 21 may include the area where the rim and/or wheel is to be located and/or the area where the servicing tools are located, both at the beginning and in the course of the wheel servicing operation. In the depicted implementation, a field of view of camera 22 covers an upper side of the rim and/or wheel. In further implementations, a second or lower camera may be provided, similar to camera 24 of the implementation of FIG. 3, with a field of view that covers a lower side of the rim and/or wheel. An additional camera on a lower side of the area where the rim and/or wheel is to be located, would have the added benefit of being able to take images showing the positions and/or orientations of second or lower bead breaker 162, even when located beneath rim 12 or wheel assembly 14, where it would potentially no longer be visible by first or upper camera 22.

The images created by the vision system 21 are converted into respective signals that are sent to a control unit 18 (not shown), and then used by the AI-based model to ascertain the presence or absence of the rim, tire or wheel (for example by applying an object classifier and/or object locator and/or object identifier model). Depending on the presence or absence of the rim, tire or wheel, the tire changer 1 is able to automatically set the apparatus so that an appropriate rim and/or wheel servicing operation can be correctly carried out. In fact, the procedure will be different depending whether only a rim is present (and in that case the tire changer will have to be set in order to carry out a tire mounting procedure) or else a tired wheel is present (and in that case the tire changer will have to be set in order to carry out a tire removing procedure). As described elsewhere herein, the step of setting up the tire changer may include various actions such as rotating the rim or wheel and/or moving the various tools in predetermined (or desired) positions. The setting of the tire changer may include moving the tools horizontally, vertically, or rotating the tools around an axis parallel and/or perpendicular to the support post center line PM. In the case of the implementation of FIG. 3, the setting may also include moving the receiving means 10 horizontally or vertically.

The setting of the tire changer 1 may also include acquiring, through the created images, information not only about the mere rim and/or tire presence or absence, but also about the tire and/or rim and/or wheel as identified by the AI-model in the created images, and storing such information in a remote information system, and/or retrieve information about the tire and/or rim and/or wheel from a remote information system. Such information may e.g. include information about tire and/or rim and/or wheel dimensions, kind, presence of defects, etc. It is worth noting that the information about the tire and/or rim and/or wheel dimensions, kind, presence of defects, etc. which is extracted by the AI-based model, can be used by the control unit 18 to correspondingly and automatically set the apparatus, so that, for instance, corresponding positioning of the tools, wheel and/or rim, etc. is automatically carried out depending on such information.

The information about the tire and/or rim and/or wheel dimensions, kind, presence of defects, etc. can also be used by the control unit 18 to invoke specific procedures. For instance, in case of particularly stiff tires, tools may have to be positioned in different locations and moved in different manner with respect to the case of soft tires. In similar fashion, the forces applied by the actuators driving the tools will have to be different. Perhaps different tools will need to be used (e.g. helper tools, etc.).

The setting of the tire changer 1 can be carried out completely automatically by the control unit 18, or only partially automatically, in which case an operator needs to complete at least parts of the setting. This may be envisaged, for instance, for safety purposes.

The setting of the tire changer 1 may be carried out at the beginning of the wheel or rim servicing procedure, for instance to position the rim or wheel and the tools in the respective initial correct positions, or else can also be carried out throughout the entire procedure. In other words, the control unit 18 may be configured to continuously use the AI-based model and follow predetermined procedures depending whether the procedure is being carried out on the rim only or on a tired wheel, and depending on the wheel or rim features the presence and position of which is detected by the vision system 21.

With reference now to FIG. 5, a third implementation of an apparatus for servicing a motor vehicle wheel or a motor vehicle rim is shown. The apparatus of FIG. 5 is a wheel balancer 2.

A wheel balancer 2 carries on different measurements depending on the presence of a naked wheel rim 12 or else a wheel assembly 14, i.e. a tire 15 mounted on a rim 12. The identification of the tire presence or absence by the AI-based model allows the control unit 18 (not shown) of the wheel balancer 2 to automatically set the proper tools, tool trajectories, processes, measurements, etc. both prior to the start of a balancing run or else during the balancing run, thus improving the productivity of the wheel balancer, at the same time avoiding mistakes affecting the safety of the wheel or rim and its components.

The wheel balancer 2 is equipped with a vision system 21 comprising three cameras 32, 34, 36. The vehicle wheel 14 is fixed in known manner to a servicing tool which comprises at least a rotating or balancing shaft 40 for supporting and rotating the wheel 14 and/or the rim 12. The wheel and/or rim is clamped to the shaft by a wheel centring and clamping device 42 at a fixing location and is mounted rotatably about an axis of rotation which is defined by the measuring shaft 40 and which, in a centred clamping condition, coincides with the wheel axis A. That ensures a stationary arrangement for the wheel axis A on the wheel balancer 2. Unbalances can be determined by appropriate measurement sensors (not shown) operatively coupled to the balancing shaft 40.

Similarly to what discussed in the case of the tire changer, an AI-based model can provide the control unit 18 of the wheel balancer 2 with information on presence or absence of the tire 15, as well as about the presence and position of wheel 14 or rim 12 features. In an implementation, depending on presence or absence of the tire as determined by the AI-based model, the control unit 18 is configured to start different servicing, e.g. balancing procedures for a wheel or a rim, respectively.

For instance, depending whether the balancing or a wheel/rim diagnosis procedure has to be applied to a rim only or to a tired wheel, the measurement sensors can be calibrated differently or else the rotation speed at which the balancing shaft 40 is set can be chosen differently. The clamping force with which the rim hub is fixed to the balancing shaft 40 by the wheel centring and clamping device 42 can also be set differently.

Tools for applying balance weights in the appropriate positions in the balancing planes in the wheel hub and/or tools for indicating the angular position relative to the wheel, may also be correspondingly and automatically set by the control unit, depending on the information extracted by the AI-based model.

Generally, the AI-based model is able to detect the presence and position of wheel or rim features, for instance the AI-based model is able to detect the number, size, shape and/or contour of the spokes of the rim. This information can be used by the control unit 18 to help determine the number and position of balancing weights that need be applied to the rim.

From the images created by the vision system, the AI-based model may also be able to identify the shape and kind of the wheel, rim and/or tire. For instance, the AI-based model can determine the type of rim and/or the inner and outer rim shape and/or the width and the diameter of the rim and/or the radial and lateral rim runout and/or bulges and depressions of the tire sidewall and/or the presence and/or type and/or position of wheel weights attached to the rim and/or improper bead seating and/or improper wheel centring and/or the tread depth and/or the radial runout of the tire tread and/or the tire geometrical conicity and/or the tread flatspots and/or an irregular tire tread wear, etcetera. Signs, writings and/or indicia on the tire sidewalls, such as DOT numbers, ply ratings, tire type and brand, size, load and inflation information, and the like, can also be identified by the AI-based model and transmitted to the control unit 18 for further use.

Similarly to the case of tire changers, the setting of the wheel balancer 2 can be carried out completely automatically by the control unit 18, or only partially automatically, in which case an operator needs to complete at least parts of the setting. This may be envisaged, for instance, for safety purposes.

Also similarly to the case of tire changers, the setting of the wheel balancer 2 may be carried out at the beginning of the wheel or rim servicing procedure, or else can also be carried out throughout the entire procedure. In other words, the control unit 18 may be configured to continuously use the AI-based model and follow predetermined procedures depending whether the procedure is being carried out on the rim only or on a tired wheel, and depending on the wheel or rim features the presence and position of which is detected by the vision system 21.

In general, and mutatis mutandis, the control unit 18 of the wheel balancer is configured to set the apparatus in the same manner as the control unit of the tire changer, at least partially or completely automatically, depending whether a presence or absence of a tire mounted on the rim is detected and/or a presence and position of wheel or rim features are identified.

LIST OF REFERENCES

1 tire changer
2 wheel balancer
10 wheel or rim receiving means
A wheel rotational axis
B machine base
P support post
PM support post center line
H horizontal direction
V vertical direction
12 rim
14 wheel
15 tire
16 fitting or removal tool
160 mounting/demounting tool
161 first bead breaker
162 second bead breaker
165 first bead breaking disc

166 second bead breaking disc
167 mounting support tool
17 actuator device
18 control unit
20 sensor device
21 vision system
22, 24, 26 camera
32, 34, 36 camera
40 shaft
42 clamping device
200 method
210 step of creating one or more images
220 step of applying an AI-based model to the one or more images
230 step of identifying an intended servicing operation a user intends to perform
240 step of setting up the apparatus for the intended servicing operation

The invention claimed is:

1. A method for removing a tire from a motor vehicle rim or for mounting a tire on a motor vehicle rim, the method comprising the steps of:

creating one or more images covering at least a portion of a tire changer;

applying an AI-based model to control the tire changer to remove the tire from the motor vehicle rim or to mount the tire on the motor vehicle rim based on the one or more images, wherein applying an AI-based model comprises the step of determining a current configuration of the motor vehicle rim, and wherein determining a current configuration of the motor vehicle rim comprises the step of determining presence and/or absence of a tire mounted on the motor vehicle rim.

2. The method of claim 1, wherein applying an AI-based model comprises the step of determining a current configuration of an apparatus and/or of a vehicle wheel.

3. The method of claim 2, further comprising the step of identifying an intended servicing operation a user intends to perform on the vehicle wheel or rim based on the current configuration of the tire changer and/or vehicle rim.

4. The method of claim 3, further comprising the step of setting up the tire changer for the intended servicing operation.

5. The method of claim 4, wherein setting up the tire changer for the intended servicing operation comprises moving at least one servicing tool of the tire changer to a predefined position and/or orientation associated with the intended servicing operation.

6. The method of claim 4, wherein setting up the tire changer for the intended servicing operation comprises moving the vehicle wheel or rim to a predefined position and/or orientation associated with the intended servicing operation.

7. The method of claim 2, wherein applying the AI-based model comprises the step of determining the presence of wheel and/or rim and/or tire features.

8. The method of claim 7, wherein the wheel and/or rim and/or tire features include an inflation valve and/or a TPMS sensor.

9. The method of claim 1, wherein applying the AI-based model comprises the step of determining the presence and/or absence of a user in the one or more images covering at least the portion of the tire changer.

10. An apparatus for servicing a motor vehicle rim, the apparatus comprising:

a vision system for creating one or more images of at least a portion of the apparatus; and a control unit configured to apply an AI-based model to the one or more images of the apparatus to determine a current configuration of the apparatus and/or motor vehicle rim and/or a vehicle wheel, wherein the AI-based model is configured to detect a presence or absence of a tire mounted on the motor vehicle rim, wherein the apparatus is a tire changer, and wherein the control unit is configured to control the apparatus to service the motor vehicle rim based on the current configuration of the apparatus and/or the motor vehicle rim and/or the vehicle and the presence or the absence of the tire mounted on the motor vehicle rim.

11. The apparatus of claim 10, wherein the vision system is operatively connected to the control unit and configured to send signals corresponding to the created one or more images to the control unit.

12. The apparatus of claim 10, further comprising at least one servicing tool for servicing the wheel or rim.

13. The apparatus of claim 10, wherein the AI-based model is configured to detect a presence and position of wheel or rim features.

14. The apparatus of claim 13, wherein the control unit, based on the presence or absence of the tire mounted on the rim and/or the presence and position of wheel or rim features, is configured to correspondingly and automatically set the apparatus for servicing the motor vehicle wheel.

* * * * *